(12) United States Patent
Watanabe et al.

(10) Patent No.: US 6,226,155 B1
(45) Date of Patent: May 1, 2001

(54) RAMP LOAD TYPE MAGNETIC DISK UNIT

(75) Inventors: Keiko Watanabe, Tsuchiura; Tetsuya Hamaguchi; Toshihiko Shimizu, both of Ibaraki-ken, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/422,351

(22) Filed: Oct. 21, 1999

(30) Foreign Application Priority Data

Oct. 23, 1998 (JP) .................................................. 10-302160

(51) Int. Cl.$^7$ ....................................................... G11B 5/54
(52) U.S. Cl. ....................................................... 360/254.8
(58) Field of Search ............................. 360/254.7, 254.8, 360/255.6, 255.7

(56) References Cited

U.S. PATENT DOCUMENTS 6,084,753 * 7/2000 Gillis et al. ........................... 360/105

* cited by examiner

*Primary Examiner*—Robert S. Tupper
(74) *Attorney, Agent, or Firm*—Antonelli, Terry, Stout & Kraus, LLP

(57) ABSTRACT

A ramp load type magnetic disk unit which prevents worn particles of a slide tab and a runway produced as a result of repetitive load/unload operations from falling onto the magnetic disk and which has low cost, high reliability and high recording density. A groove portion as a worn particle removing mechanism is provided at a home position on the runway where the magnetic head support assembly stands by after the unload operation is finished. At the groove portion, the magnetic head support assembly is vibrated at low frequencies to scrape off the particles. A worn particle collecting portion is provided near the groove portion so that an air flow generated by the rotation of the magnetic disk and directed toward the collecting portion blows the worn particles caught in the grooves into the particle collecting portion.

7 Claims, 4 Drawing Sheets

RAMP LOAD TYPE MAGNETIC DISK UNIT

BACKGROUND OF THE INVENTION

1. Field of the Invention

The present invention relates to a ramp load type magnetic disk unit and more particularly to a magnetic disk unit suited for disposing of worn particles on a runway of a ramp.

2. Description of the Related Art

A contact start stop (CSS) system is still a commonly used technique of handling a slider when the magnetic disk unit is stopped or started. That is, the slider mounting the magnetic head rests in contact with the surface of the magnetic disk while the unit is stopped. When it is started and the magnetic disk begins to rotate, the slider slides on the surface of the magnetic disk and, when the disk rotation exceeds a predetermined speed, floats over the disk and remains in a steady state. In the stopping process, as the rotation speed of the disk lowers, the slider comes into contact with and slides on the surface of the disk until it stops and rests on the disk.

To prevent the slider from sticking to the magnetic disk, both having smooth surfaces, the CSS system has the surface of the magnetic disk formed with slight undulations (texture surface processing). To improve the recording density, however, the floating distance of the slider from the disk must be minimized, which necessitates the surface of the disk to be formed smoother. Therefore, the undulations on the magnetic disk surface can no longer be tolerated.

A load/unload system is advantageous in this respect. In this system, while magnetic disk unit is stopped, the slider is retracted from the magnetic disk surface. When the magnetic disk rotation reaches a normal speed, the slider is loaded from the retracted or standby position onto the disk surface. When the unit is to be stopped, the slider is unloaded to the standby position before the disk rotation speed is lowered.

With this system, because the slider is not in contact with the disk surface while at rest, there is no need to provide the disk surface with undulations. This is advantageous in reducing the floating distance and increasing the recording density. Of the load/unload system, a ramp load system is simplest in structure and most feasible.

This system has a ramp, a member with a runway, which has an inclined portion near the outermost or innermost periphery of the magnetic disk. During the load/unload operation, a part of the suspension supporting the slider moves up or down the ramp to load/unload the slider.

An example of the ramp load system is the one disclosed in Japanese Patent Laid-Open No. 8-263946. In this conventional technology, a raised spherical member is provided where the suspension slides on the ramp.

In DCTA-24090 (Travelstar 4GT) and DPLA-25120 (Travelstar 5GS), recently commercialized by IBM, a slide portion that slides on the ramp is a dimple shaped like a raised bottom of a boat which is formed by extending one spherical member. The longitudinal direction of the slide portion is arranged perpendicular to the direction of its movement.

The ramp and the slide tab wear out as they are subjected to repetitive compressive and shearing stresses from pressing loads and frictional forces. Particles produced by the wear adhere to the ramp and the slide tab. When the load/unload operation is performed with the particles attached to the ramp and slide tab, the worn particles are very likely to fall on the magnetic disk and be trapped between the slider and the disk, causing unrecoverable damage to the unit as a whole.

Japanese Patent Laid-Open No. 5-166322 discloses a structure that has a projection in the ramp inclined portion to control the speed of the slider landing on the ramp. Although the particles adhering to the slide tab are scraped off by the projection, because the inclined portion is located near the magnetic disk, the particles thus scrapped off are very likely to fall onto the disk. At the inclined portion the sliding speed cannot be set close to zero and the contact stress at the projection is large, so that the wear of the projection will increase the unwanted particles.

SUMMARY OF THE INVENTION

The object of the present invention is to provide a ramp load type magnetic disk unit, one type of the load/unload type magnetic disk unit, which can prevent particles produced by the wear of the ramp and slide tab during their repetitive operations from falling onto the magnetic disk, thus enhancing the reliability and recording density and reducing the cost of the unit.

To achieve the above objective, the ramp load type magnetic disk unit according to the invention comprises: a magnetic head support assembly for supporting a magnetic head, the magnetic head being adapted to record or reproduce information on the magnetic disk; and a ramp having a runway on which the magnetic head support assembly slides as it is loaded onto or unloaded from the magnetic disk; wherein the runway has a mechanism for removing worn particles produced by the magnetic head support assembly sliding on the runway.

Further, the ramp load type magnetic disk unit comprises: a magnetic disk for recording information; a magnetic head support assembly comprising a magnetic head for recording and reproducing information on the magnetic disk, a slider having the magnetic head mounted thereon, a suspension supporting the slider, and an arm supporting the suspension; a drive mechanism for moving the magnetic head support assembly to a predetermined position; a ramp having a runway on which the magnetic head support assembly slides as it is loaded onto or unloaded from the magnetic disk; a worn particle removing mechanism for removing worn particles, the worn particles being produced by the sliding between the magnetic head support assembly and the runway, the worn particles adhering to a sliding portion of the magnetic head support assembly; and a worn particle collecting portion for collecting the worn particles so that they will not fall on the magnetic disk.

The worn particle removing mechanism has grooves formed at a home position on the runway where the magnetic head support assembly stands by.

The magnetic head support assembly is given low-frequency vibrations at the grooves. The invention is also characterized in that an area for collecting the worn particles is provided near the grooves.

With this invention, the worn particles adhering to the slide tab can be removed by the particle removing mechanism such as grooves. Further, the particles adhering to the slide tab can also be removed efficiently by vibrations and then the particles caught in the grooves can be collected in other area.

DETAILED DESCRIPTION OF THE PREFERRED EMBODIMENTS

Embodiments of the present invention will be described with reference to the accompanying drawings.

Figure 1:
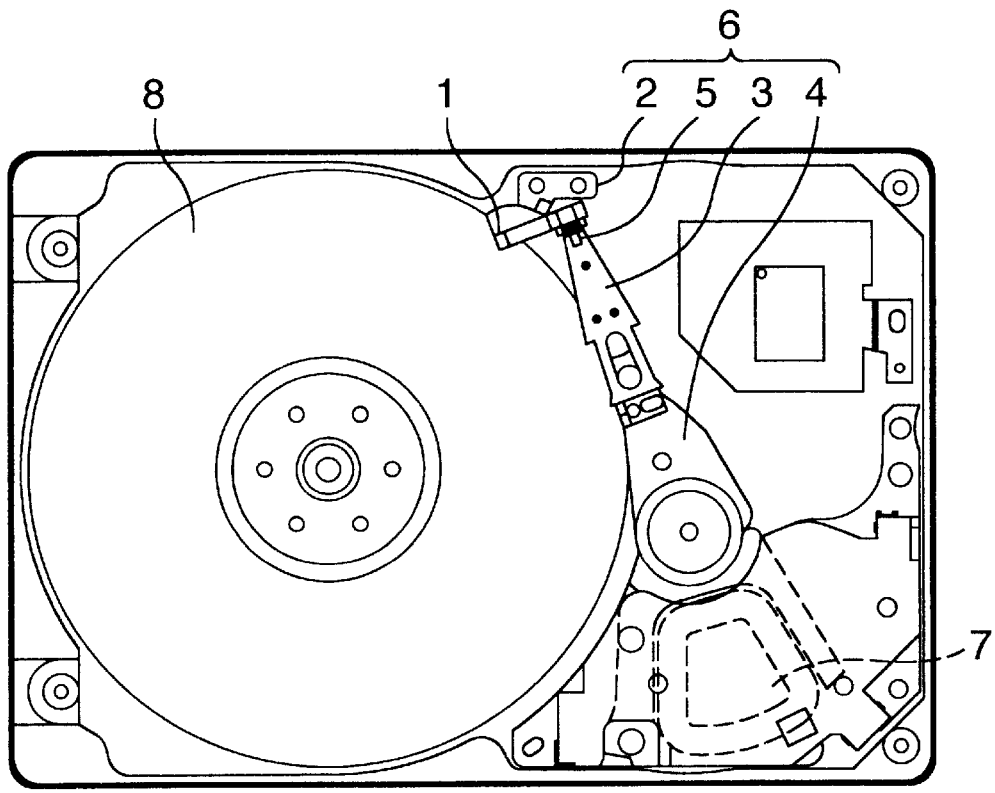
FIG. 1 is a plan view showing an embodiment of a magnetic disk unit according to the present invention.
Figure 2:
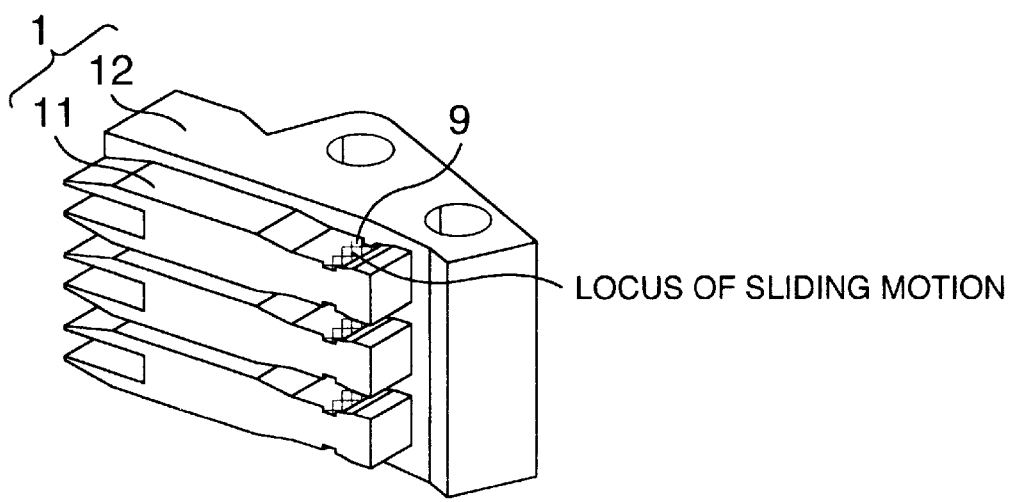
FIG. 2 is a perspective view of a ramp according to the invention.

FIG. 1 is a plan view showing one embodiment of a magnetic disk unit according to the present invention. FIG. 2 is a perspective view showing an essential part of this embodiment.

As shown in FIG. 1, a magnetic disk 8 is mounted on a rotating shaft of a spindle motor not shown that drives the magnetic disk. A slider 5 on which a magnetic head is mounted (hereinafter referred to as a magnetic head slider 5) is mounted on a suspension 3 that supports it. The suspension 3 is mounted on an arm 4 that is combined with a drive mechanism 7 for moving the magnetic head onto the magnetic disk. An assembly of the magnetic head slider 5, the suspension 3 and the arm 4 is called a magnetic head support assembly 6. The magnetic head support assembly 6 constitutes a pivotable actuator which is pivoted and moved over the magnetic disk 8 by the drive mechanism 7. At the front end of the suspension 3 is provided a slide tab 2 shaped like a raised bottom of a boat which slides over a runway of a ramp.

Where the front end of the suspension 3 travels outside the outermost periphery of the magnetic disk 8 there is provided a ramp 1 with a runway on which the magnetic head can rest. The ramp 1, as shown in FIG. 2, comprises a runway 11 on which the slide tab 2 travels, a groove portion 9 provided at a home position where the magnetic head support assembly 6 stands by and rests, and a ramp support portion 12 for supporting these and securing them to the magnetic disk unit body.

A brief explanation will be given here as to an unloading operation. A loading operation is reverse to the unloading operation. In the magnetic disk unit of this embodiment, if during the rotation of the magnetic disk the magnetic head finishes reproduction or recording of information on the disk in response to a command from a controller not shown, the drive mechanism 7 moves the magnetic head support assembly 6, while keeping the magnetic disk 8 rotating in the same condition, until the magnetic head slider 5 comes to the outermost periphery of the magnetic disk 8. When it reaches the outermost periphery, the magnetic head slider 5 loses its air buoyancy and the front end of the suspension lowers causing a slide portion at the front end of the suspension to contact the runway 11 of the ramp 1. In this state, the drive mechanism 7 continues to produce a drive force that drives the magnetic head slider 5 toward the home position on the ramp, with the result that the magnetic head support assembly 6 slides over the runway 11 to the home position. As the magnetic head support assembly 6 comes near the home position, the drive mechanism 7 gradually reduces its drive force and stops, bringing the magnetic head to a halt.

Figure 3:
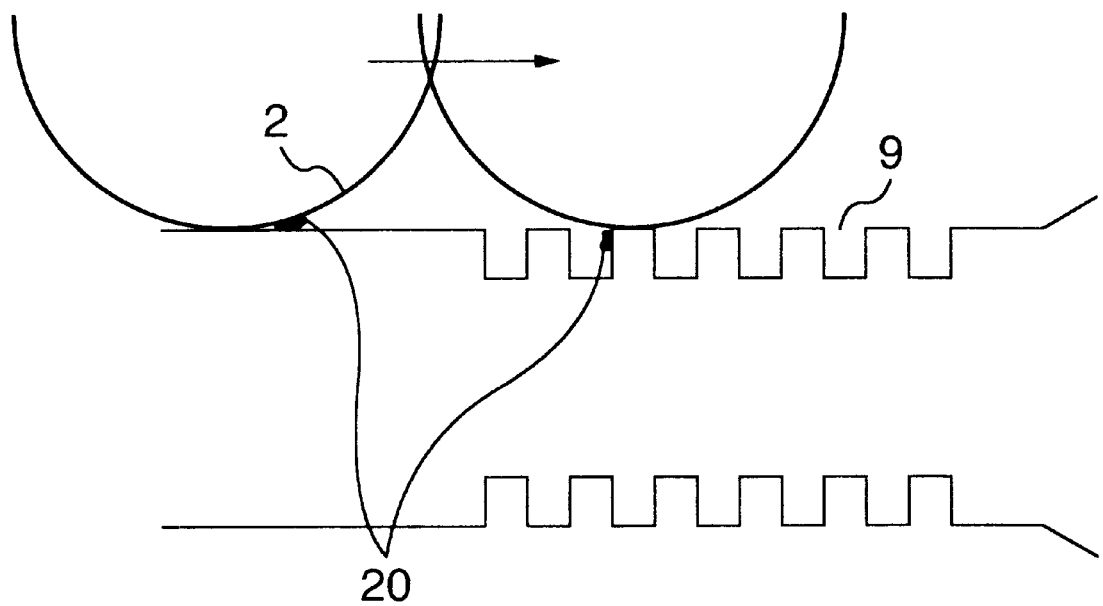
FIG. 3 is a cross section of the ramp near a home position, showing the action of the invention.

Next, the effect of the above embodiment will be described by referring to FIGS. 3 and 4.

Worn particles 20 formed as the slide tab 2 at the front end of the suspension slides over the runway 11 of the ramp 1 adhere to the slide tab 2 and are carried to the home position where they are scraped off the slide tab 2 by the groove portion 9 and received into grooves of the groove portion 9.

There is little possibility that the worn particles 20 taken into the grooves will adhere again to the slide tab 2. If the grooves are shaped so that their cross sections become narrower toward the surface as shown in FIG. 4, the scraping effect and the particle re-adhesion prevention effect can be improved.

Because at the home position the speed of the slide tab 2 generally is almost zero, there is little abrasion at the groove portion 9. The size of the worn particles is about one to several $\mu$m across. If the depth and width of each groove is set to about 100–200 $\mu$m, the worn particles 20 can be removed easily. The area where the groove portion 9 (consisting of a plurality of grooves) is provided is, for example, about several mm long.

When the ramp 1 is formed by injection molding, the groove portion 9 can easily be formed by processing the corresponding surface of a mold to form raised portions or provide projections thereon.

Even if the worn particles cannot be removed completely, they can at least be prevented from aggregating and becoming large. When non-aggregate particles fall during operation, they do not reach the magnetic disk and are blown away by an air flow produced by the rotation of the magnetic disk as the non-aggregate particles are infinitesimally small and very light. Thus, the non-aggregate particles will not lead to a serious trouble.

Figure 4:
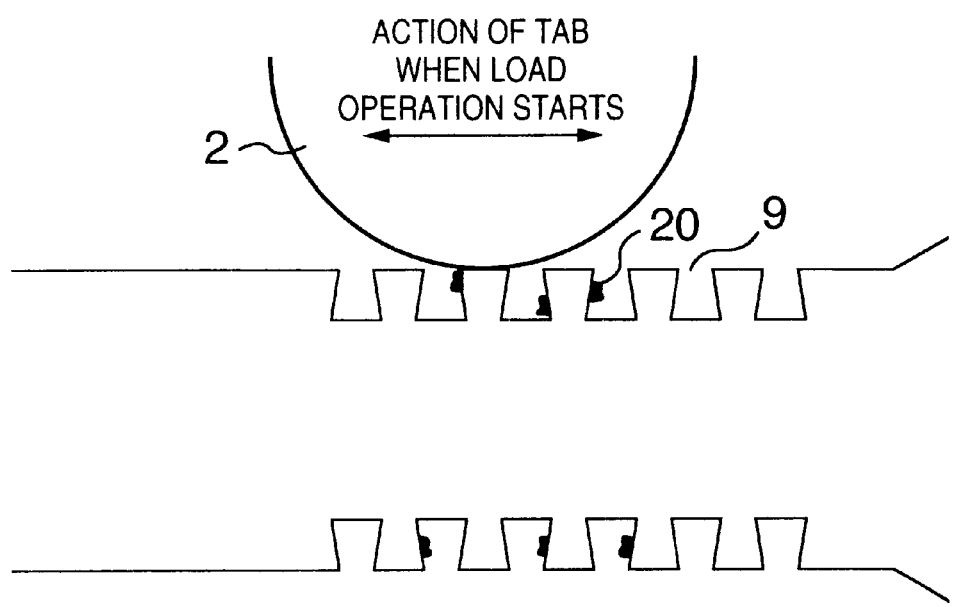
FIG. 4 is a cross section of the ramp near the home position, showing another action of the invention.

When the magnetic head support assembly 6 begins to be loaded from the home position where it was resting or when, after being unloaded, it rests at the home position, the slide tab 2 on the groove portion 9 formed at the home position as shown in FIG. 4 is vibrated to the left and right at a low frequency of several Hz or lower two or three times. This further improves the particle removing effect. Although the vibration at the low frequency can be produced by the drive mechanism 7, a separate drive source may be provided.

Figure 5A:
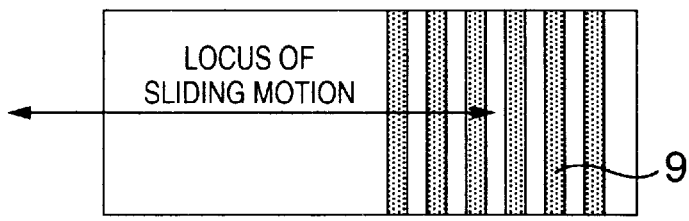
FIGS. 5A–5C are plan views showing examples of groove portions according to the invention.
Figure 5B:
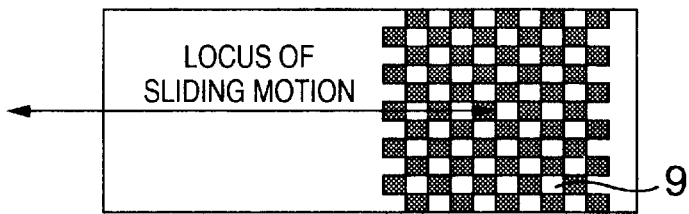
Figure 5C:
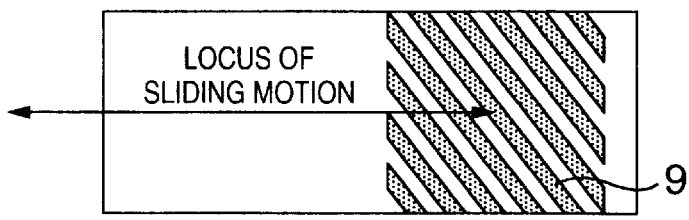

FIGS. 5A–5C show some configurations of the groove portion 9. These are only examples and the groove portion 9 is not limited to these shapes. In the figure, the hatched areas are grooves. The grooves shown in FIG. 5A are linearly shaped and thus easily fabricated. The grooves shown in FIG. 5B are formed in a checkered pattern and can uniformly scrape the worn particles adhering to the slide tab. The grooves shown in FIG. 5C, which are formed at a certain angle to the direction of movement of the slide tab, produce an effect intermediate between those of FIG. 5A and FIG. 5B.

Figure 6:
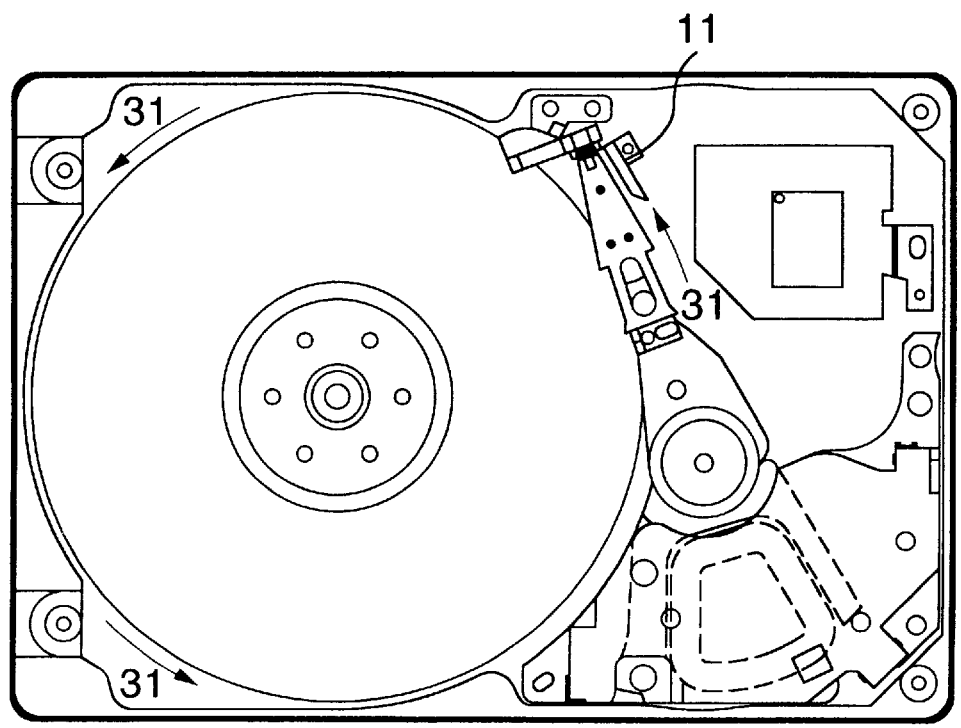
FIG. 6 is a plan view showing another embodiment of a magnetic disk unit according to the invention.
Figure 7:
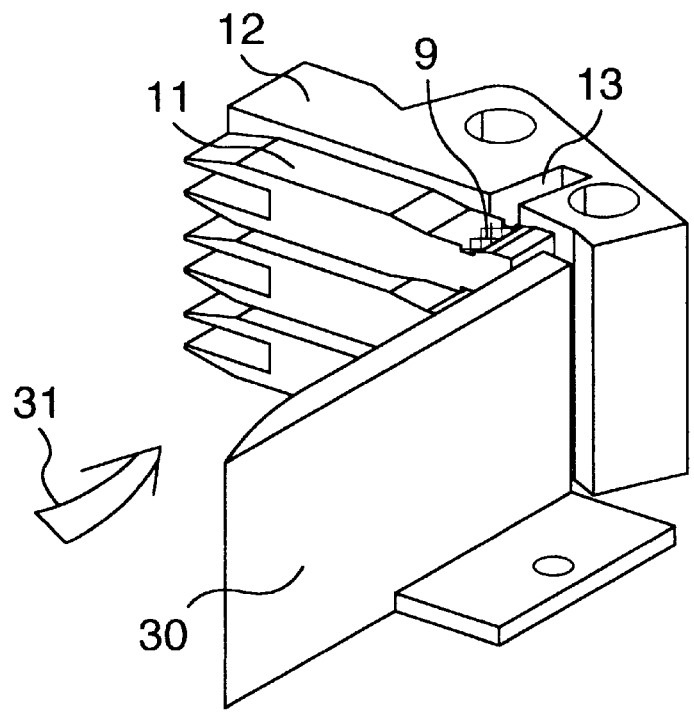
FIG. 7 is a perspective view of the embodiment of FIG. 6 near the ramp.

FIGS. 6 and 7 show another embodiment of the invention.

As shown in these figures, this embodiment has a notch portion 13 for collecting worn particles which is formed in the ramp support portion 12 of the ramp 1 by the side of the groove portion 9 formed at the home position on the runway. An air flow generated by the rotation of the disk is introduced into the groove portion, and an air flow guide fin 30 for guiding the air into the notch portion is installed at a position adjoining the ramp 1.

Figure 8:
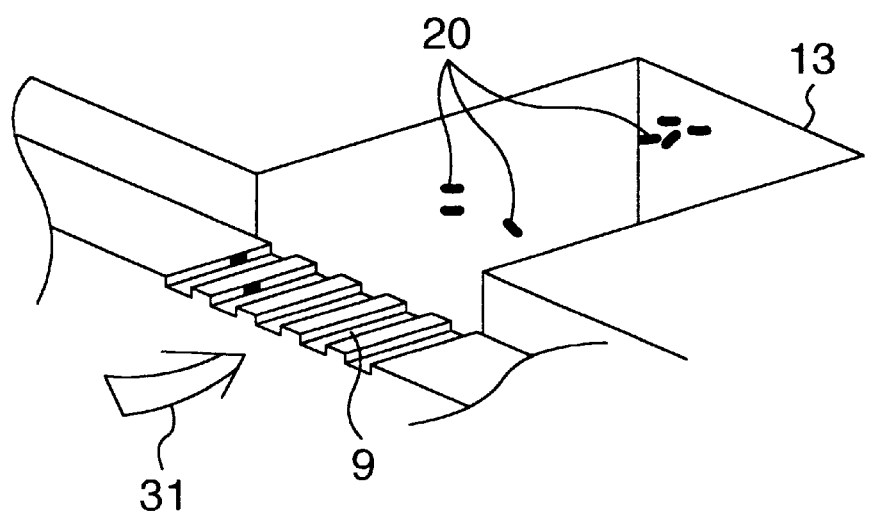
FIG. 8 is a perspective view showing the action of the embodiment of FIG. 6.

Next, the operation of this embodiment will be described by referring to FIG. 8.

Because the magnetic disk is rotating when the magnetic head slider is loaded onto the magnetic disk, an air flow 31 is generated outside the magnetic disk by the rotation of the magnetic disk. This air flow is guided by the air flow guide fin 30 toward the notch portion 13 so that the worn particles 20, scraped by and received in the groove portion 9, can be blown into the notch portion 13 where they are collected. The bottom of the groove portion 9 may be inclined downwardly toward the notch portion so that even when the particles are not blown by the air flow, they can easily be moved toward and collected in the notch portion.

With this invention, the worn particles from the ramp and the slide tab produced as a result of repetitive operations can be removed by a simple method and thus prevented from falling onto the magnetic disk.

This improves the reliability of the load/unload operations and the float reliability of the magnetic head slider. Therefore, a magnetic disk unit with high recording density can be provided at low cost.

What is claimed is:

1. A ramp load type magnetic disk unit comprising:

a magnetic head support assembly for supporting a magnetic head, the magnetic head being adapted to record or reproduce information on the magnetic disk; and a ramp having a runway on which the magnetic head support assembly slides as it is loaded onto or unloaded from the magnetic disk;

wherein the ramp has a mechanism for removing worn particles produced by the magnetic head support assembly sliding on the runway.

2. A ramp load type magnetic disk unit comprising:

a magnetic disk for recording information;

a magnetic head support assembly comprising a magnetic head for recording and reproducing information on the magnetic disk, a slider having the magnetic head mounted thereon, a suspension supporting the slider, and an arm supporting the suspension;

a drive mechanism for moving the magnetic head support assembly to a predetermined position;

a ramp having a runway on which the magnetic head support assembly slides as it is loaded onto or unloaded from the magnetic disk;

a worn particle removing mechanism for removing worn particles, the worn particles being produced by the sliding between the magnetic head support assembly and the runway, the worn particles adhering to a sliding portion of the magnetic head support assembly; and a worn particle collecting portion for collecting the worn particles so that they will not fall on the magnetic disk.

3. A ramp load type magnetic disk unit according to claims 1 or 2, wherein the worn particle removing mechanism is a groove portion comprising a plurality of grooves formed at a home position on the runway of the ramp where the magnetic head support assembly stands by.

4. A ramp load type magnetic disk unit according to claims 1 or 2, wherein the worn particle removing mechanism is a groove portion comprising a plurality of grooves formed at a home position on the runway of the ramp where the magnetic head support assembly stands by and wherein the magnetic head support assembly is given low-frequency vibrations at the groove portion.

5. A ramp load type magnetic disk unit according to claim 1, wherein the worn particle removing mechanism has a groove portion consisting of a plurality of grooves formed at a home position on the runway of the ramp where the magnetic head support assembly stands by, and wherein a worn particle collecting portion for collecting the worn particles is provided near the groove portion.

6. A ramp load type magnetic disk unit according to claims 2 or 5, wherein the worn particle collecting portion is arranged downstream of the worn particle removing mechanism with respect to an air flow generated by the rotation of the magnetic disk.

7. A ramp load type magnetic disk unit according to claim 6, wherein the worn particle removing mechanism of the ramp is provided with a fin for introducing the air flow to the worn particle removing mechanism.

\* \* \* \* \*